Figure 2:
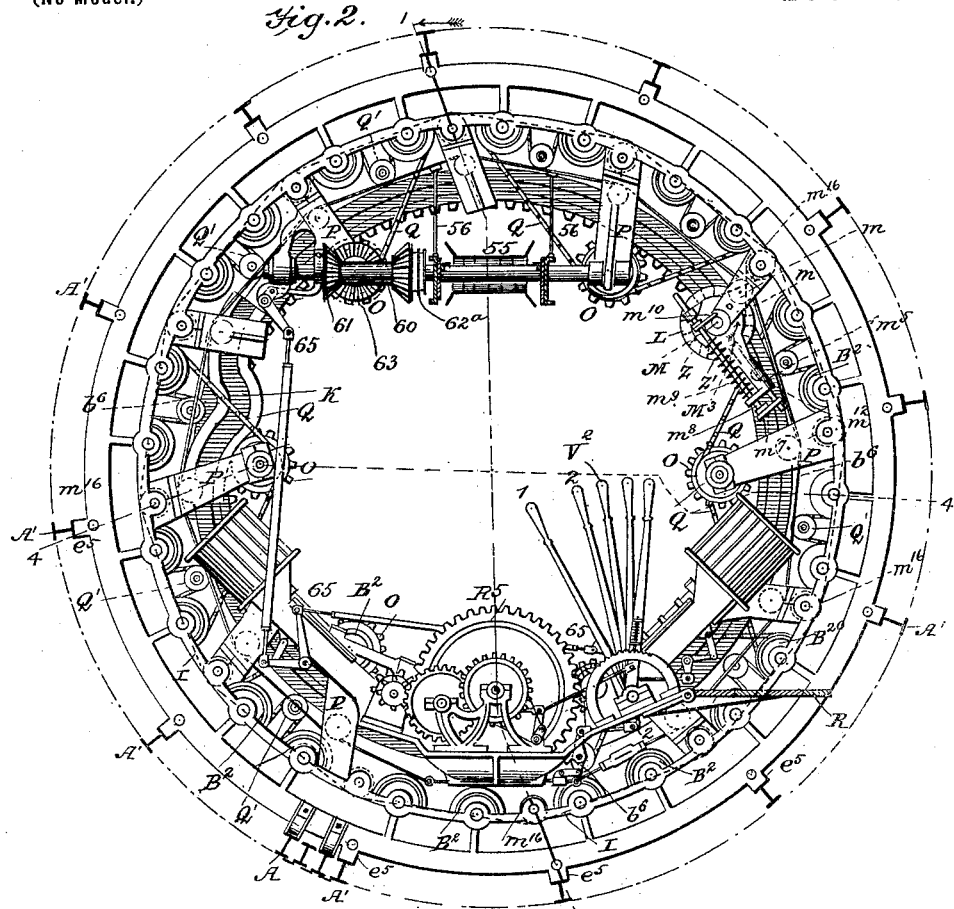

No. 690,137. Patented Dec. 31, 1901.
J. E. ENNIS.
TUNNELING MACHINE.
(Application filed Apr. 6, 1897.)
(No Model.) 12 Sheets—Sheet 1.
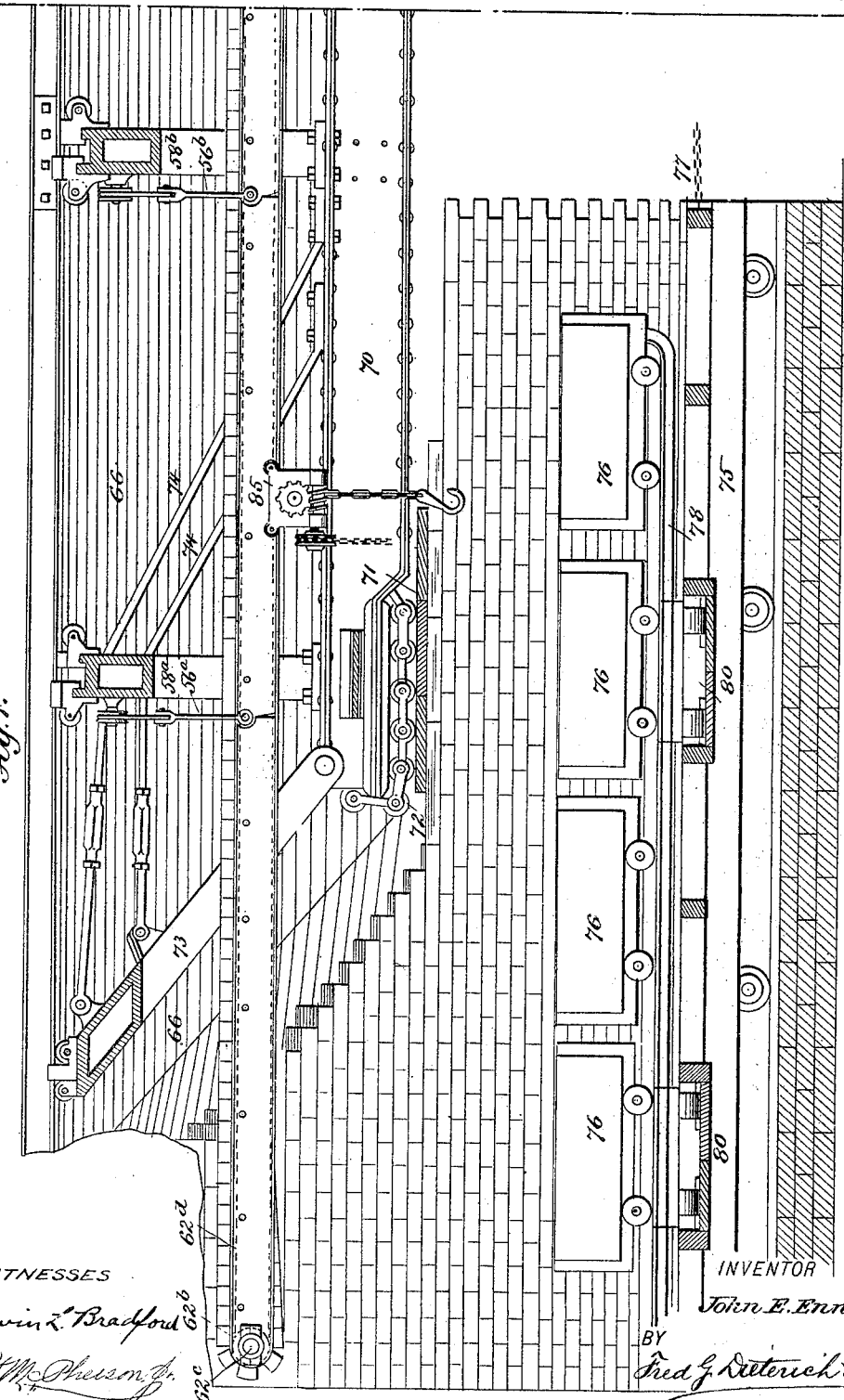
WITNESSES
INVENTOR
John E. Ennis
BY
Fred G. Dieterich & Co.
ATTORNEYS.

No. 690,137. Patented Dec. 31, 1901.
J. E. ENNIS.
TUNNELING MACHINE.
(Application filed Apr. 6, 1897.)
(No Model.) 12 Sheets—Sheet 2.
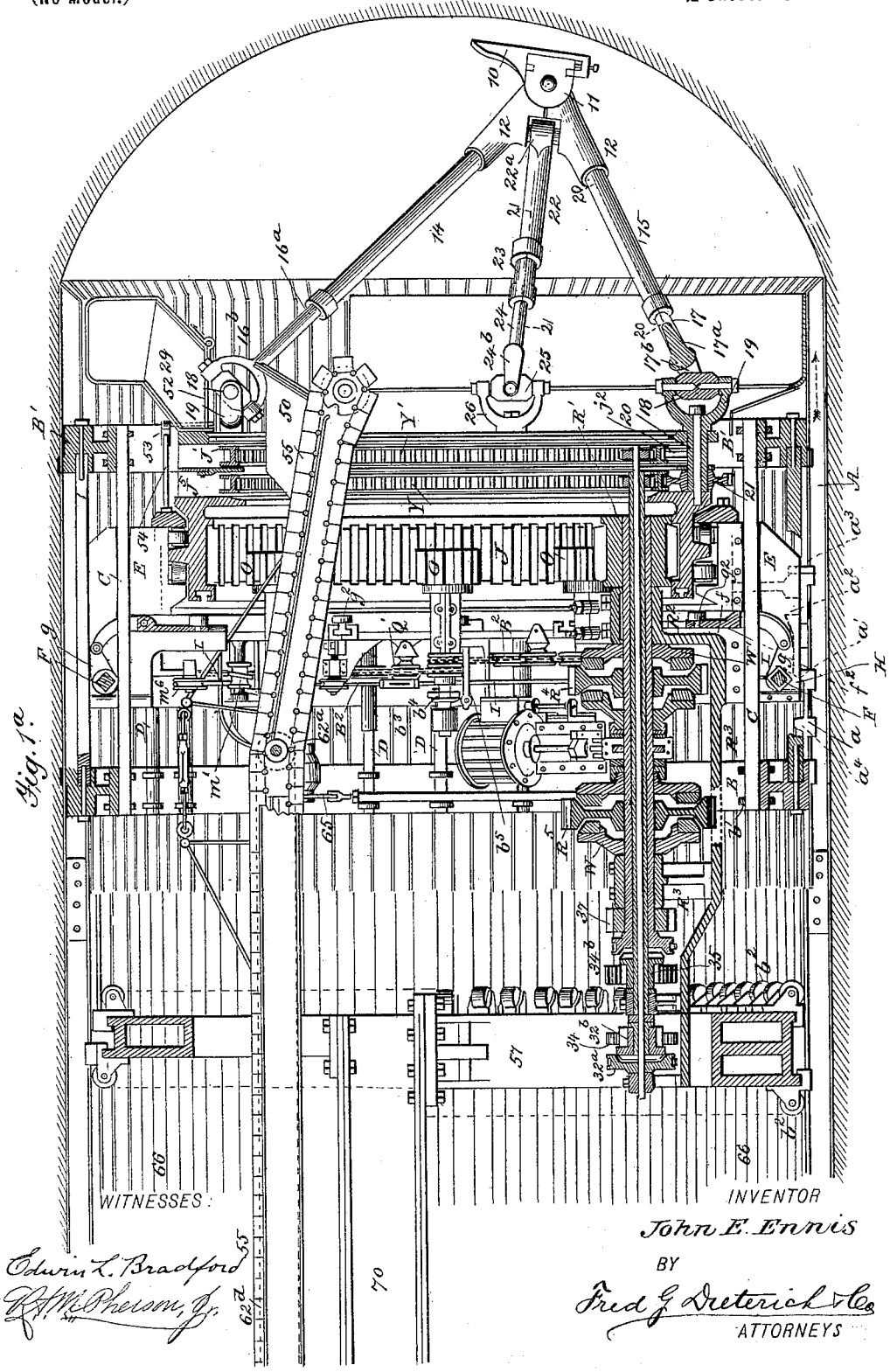
WITNESSES:
Edwin L. Bradford
R. H. McPherson, Jr.
INVENTOR
John E. Ennis
BY
Fred G. Dieterich & Co.
ATTORNEYS No. 690,137. Patented Dec. 31, 1901.
J. E. ENNIS.
TUNNELING MACHINE.
(Application filed Apr. 6, 1897.)

(No Model.) 12 Sheets—Sheet 3.

WITNESSES

INVENTOR
John E. Ennis
BY
Fred G. Dieterich & Co.
ATTORNEYS

No. 690,137. Patented Dec. 31, 1901.
J. E. ENNIS.
TUNNELING MACHINE.
(Application filed Apr. 6, 1897.)
(No Model.) 12 Sheets—Sheet 4.
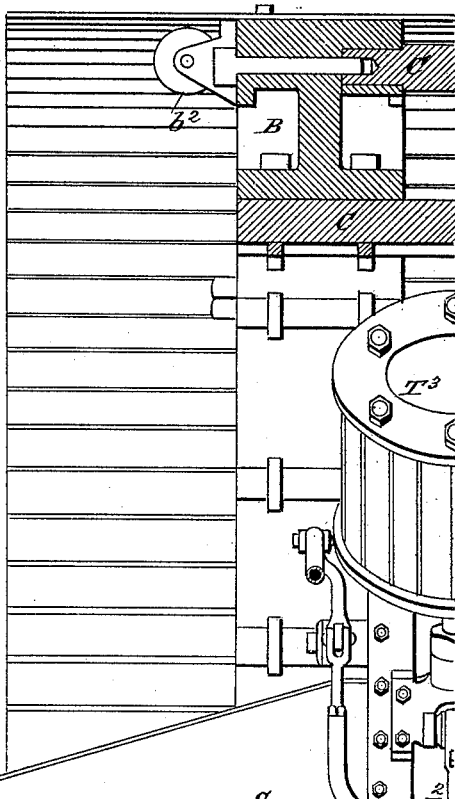
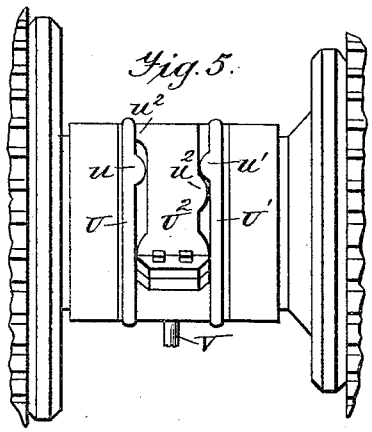
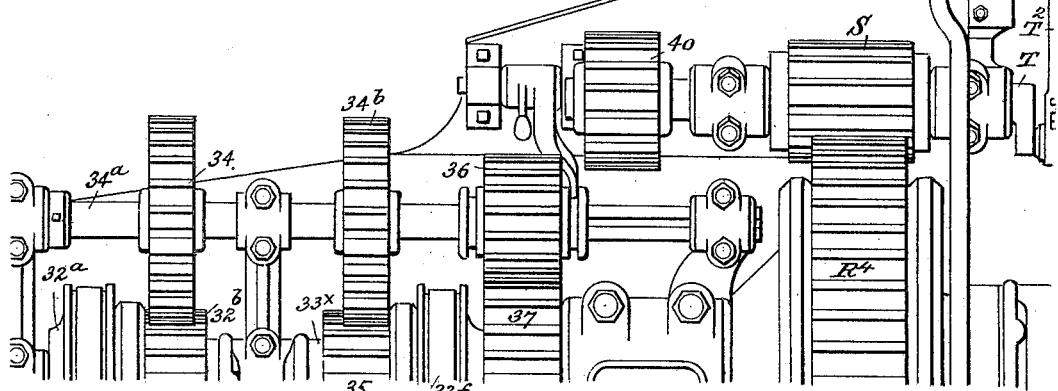
WITNESSES:
Edwin L. Bradford
INVENTOR
John E. Ennis
BY
Fred G. Dieterich & Co.
ATTORNEYS No. 690,137. Patented Dec. 31, 1901.
J. E. ENNIS.
TUNNELING MACHINE.
(Application filed Apr. 6, 1897.)
(No Model.) 12 Sheets—Sheet 5.
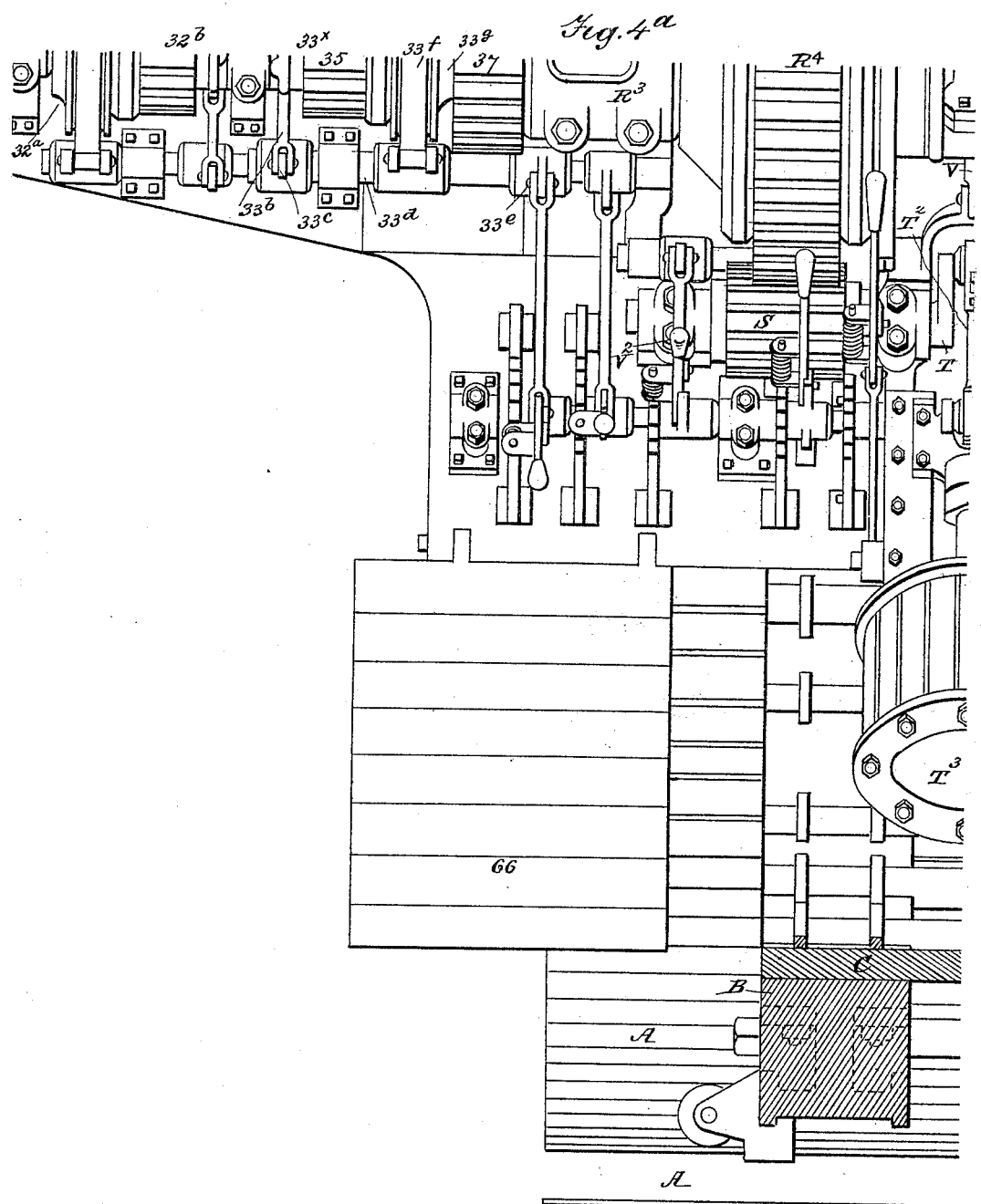
WITNESSES:
Edwin L. Bradford
R. H. McPherson Jr.
INVENTOR
John E. Ennis
BY
Fred G. Dieterich & Co.
ATTORNEYS No. 690,137. Patented Dec. 31, 1901.
J. E. ENNIS.
TUNNELING MACHINE.
(Application filed Apr. 6, 1897.)
(No Model.) 12 Sheets—Sheet 6.
Fig. 4.b
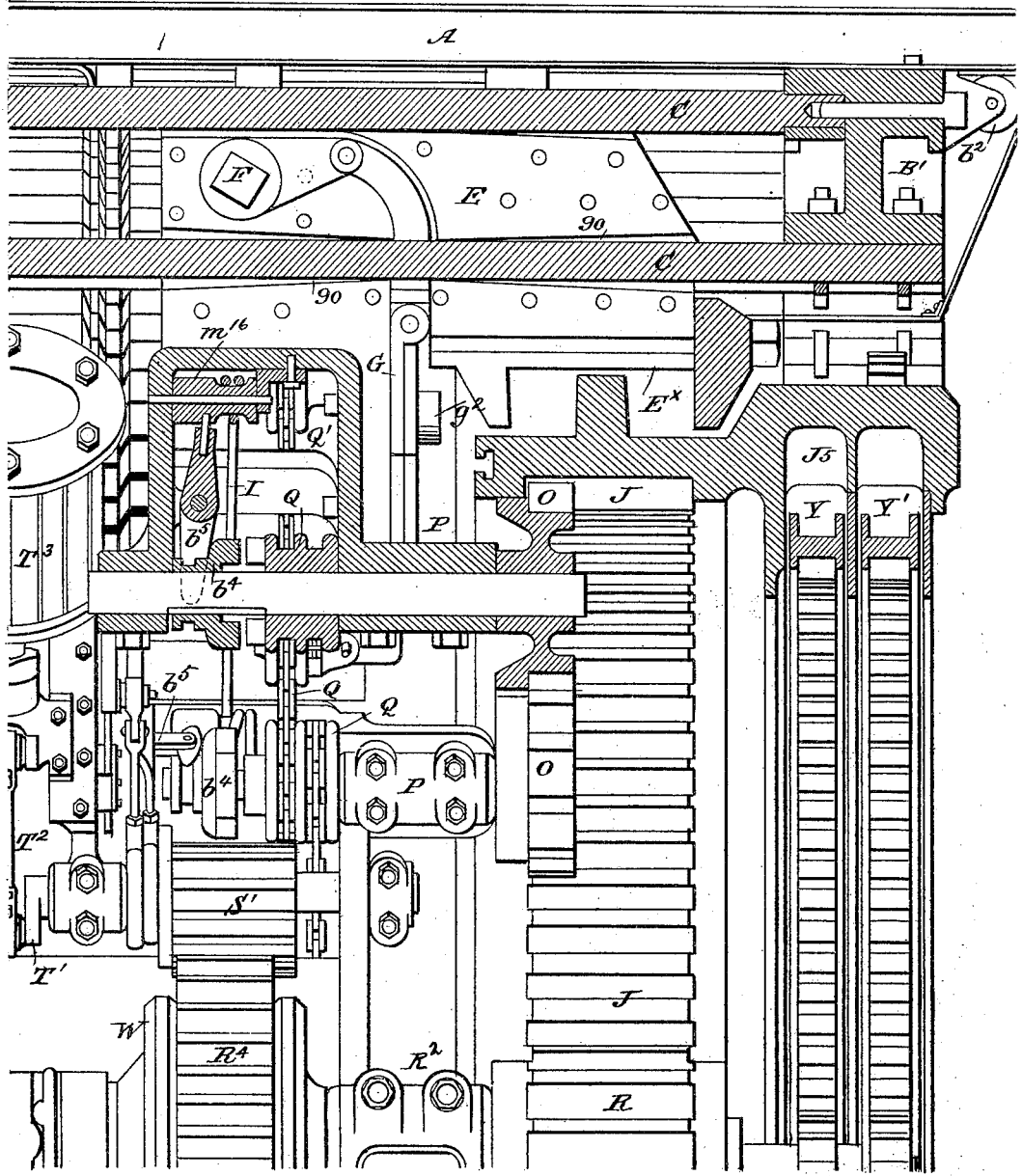
WITNESSES:
Edwin L. Bradford
J. H. McPherson, Jr.
INVENTOR
John E. Ennis
BY
Fred G. Dieterich & Co.
ATTORNEYS No. 690,137. Patented Dec. 31, 1901.
J. E. ENNIS.
TUNNELING MACHINE.
(Application filed Apr. 6, 1897.)
(No Model.) 12 Sheets—Sheet 7.
Fig. 4.c
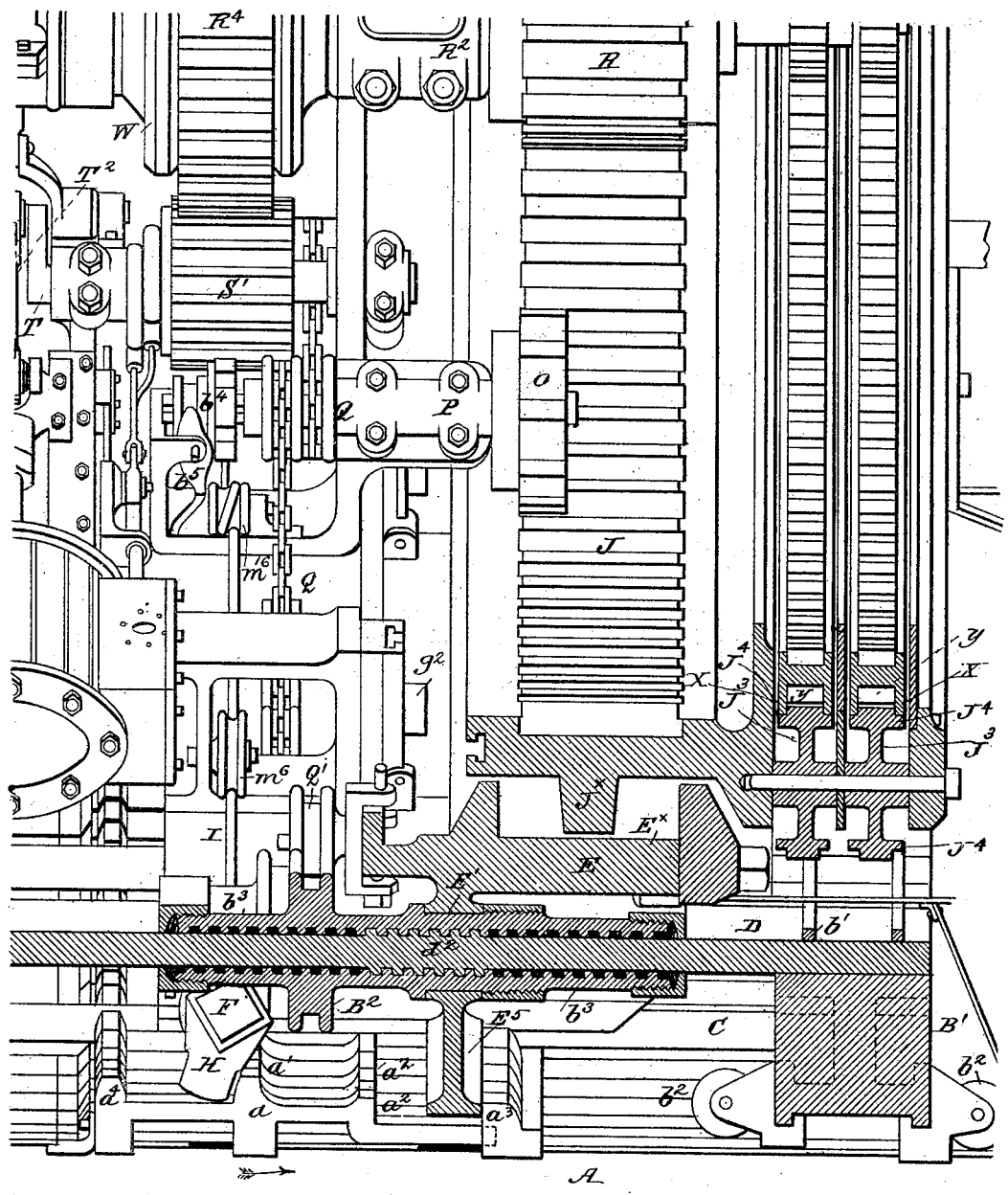
WITNESSES:
Edwin L. Bradford
INVENTOR
John E. Ennis
BY
Fred G. Dieterich & Co.
ATTORNEYS No. 690,137. Patented Dec. 31, 1901.
J. E. ENNIS.
TUNNELING MACHINE.
(Application filed Apr. 6, 1897.)

(No Model.) 12 Sheets—Sheet 8.

WITNESSES:
Edwin L. Bradford
R. H. McPherson Jr.

INVENTOR
John E. Ennis
BY
Fred G. Dieterich & Co
ATTORNEYS

No. 690,137. Patented Dec. 31, 1901.
J. E. ENNIS.
TUNNELING MACHINE.
(Application filed Apr. 6, 1897.)
(No Model.) 12 Sheets—Sheet 9.
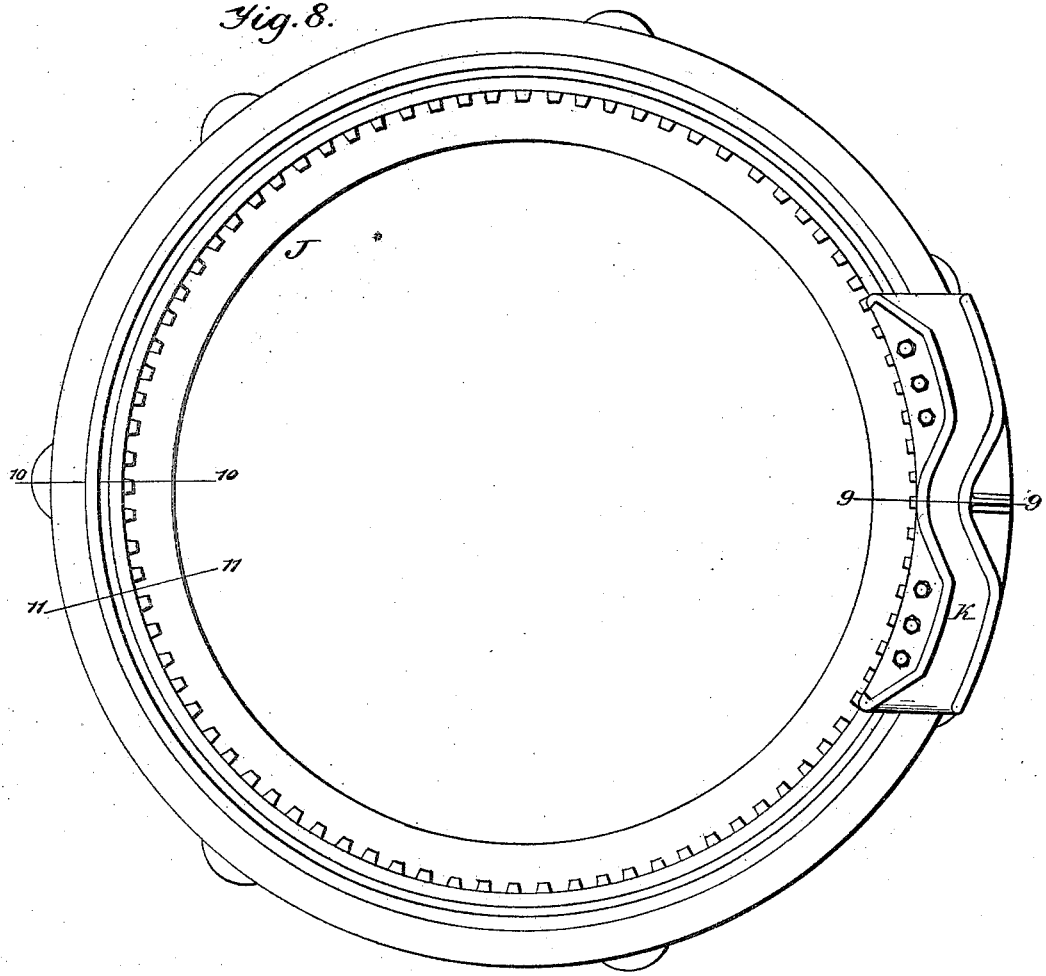
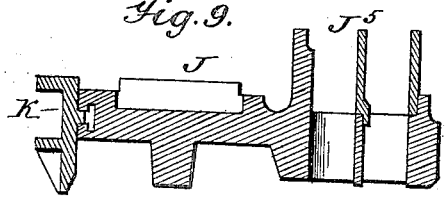
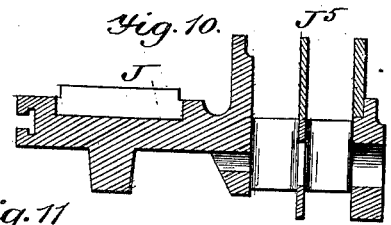
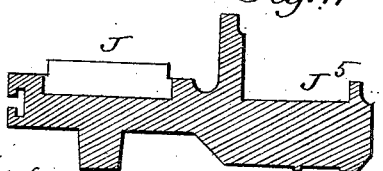
WITNESSES:
Edwin L. Bradford
R. H. McPherson, Jr.
INVENTOR
John E. Ennis
BY
Fred G. Dieterich & Co.
ATTORNEYS No. 690,137. Patented Dec. 31, 1901.
J. E. ENNIS.
TUNNELING MACHINE.
(Application filed Apr. 6, 1897.)
(No Model.) 12 Sheets—Sheet 10.
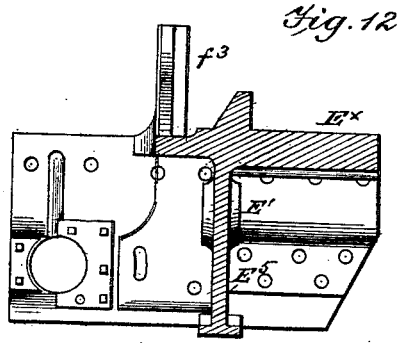
Fig. 12.
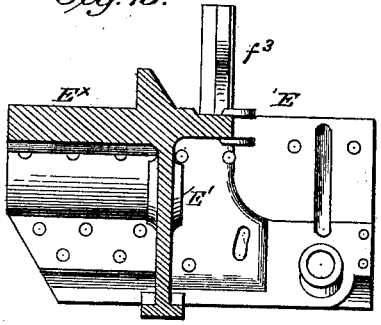
Fig. 13.
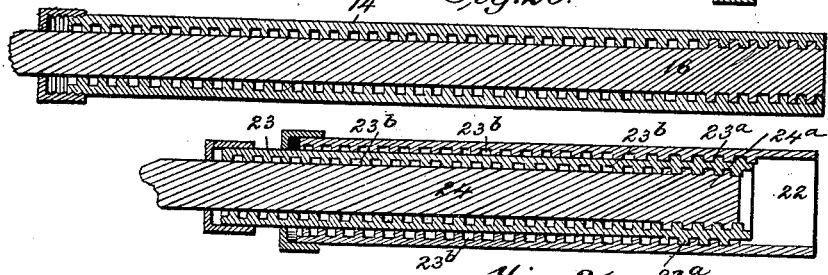
Fig. 20.
Fig. 21.
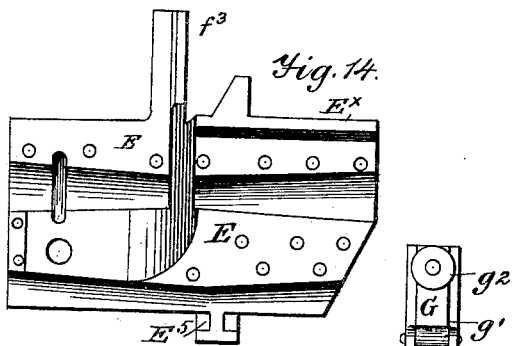
Fig. 14.
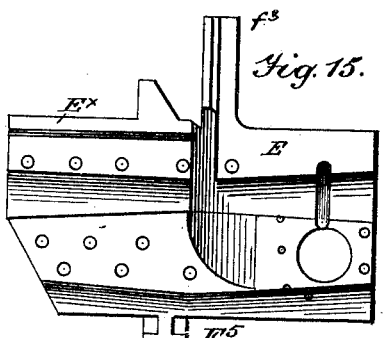
Fig. 15.
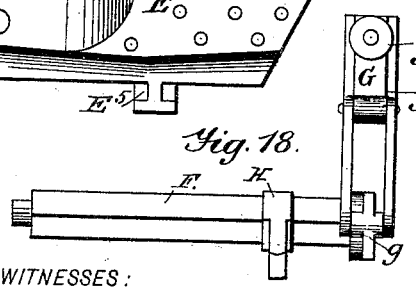
Fig. 18.
Fig. 19.
WITNESSES:
Edwin L. Bradford
R. H. McPherson Jr.
INVENTOR
John E. Ennis
BY
Fred G. Dieterich & Co.
ATTORNEYS WITNESSES:
Edwin L Bradford
R. H. McPherson Jr.

INVENTOR
John E. Ennis
BY
Fred G. Dieterich & Co.
ATTORNEYS

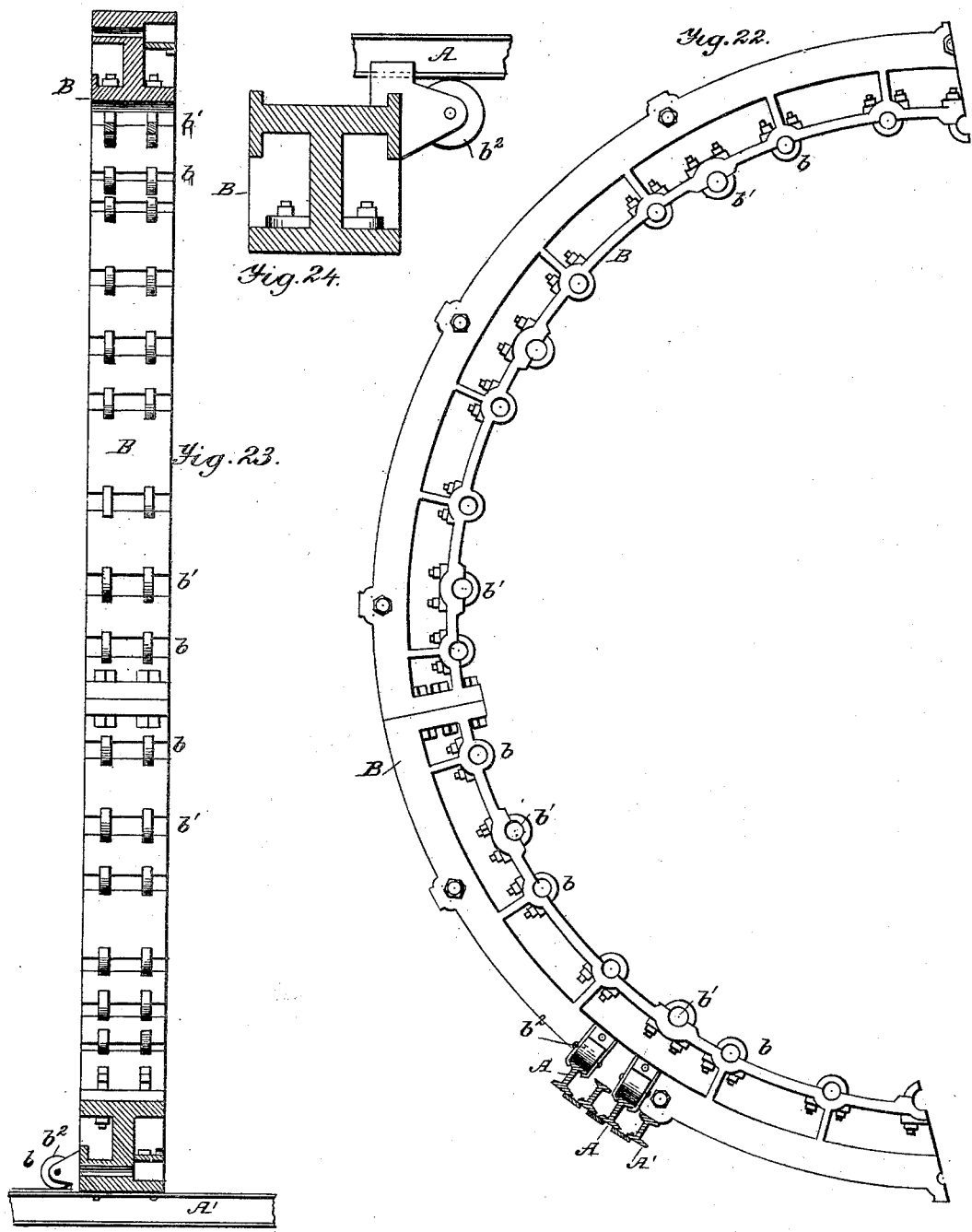

UNITED STATES PATENT OFFICE.

JOHN E. ENNIS, OF CHICAGO, ILLINOIS.

TUNNELING-MACHINE.

SPECIFICATION forming part of Letters Patent No. 690,137, dated December 31, 1901.

Application filed April 6, 1897. Serial No. 630,950. (No model.)

*To all whom it may concern:*

Be it known that I, JOHN E. ENNIS, residing at Chicago, in the county of Cook and State of Illinois, have invented a new and Improved Tunneling-Machine, of which the following is a specification.

This invention relates to improvements in mechanisms for constructing tunnels; and it primarily has for its object to provide a mechanism for this purpose which will serve to dig the tunnel to its proper shape without blasting and which at the same time will support the newly-made tunnel-walls until the same are faced with a brick or other suitable lining.

This invention also comprehends certain novel constructions and improved arrangement of parts in mechanisms of the character stated which will dig a tunnel of a circular form and which has its digging feed mechanism, and supporting means so arranged that as a new portion is being dug the previously-cut portion can be bricked, whereby to render the operation of digging and lining the tunnel-wall practically a simultaneous one.

Furthermore, my invention seeks to provide a tunneling-machine having an improved form of digger or shovel so operated as to cut into the tunnel-head spirally, whereby to quickly and to effectively remove the earth and facilitate the feed of the digging mechanism forward.

Another object of this invention is to provide certain improvements in tunneling-machines, including a novel form of digger-plow, which operates to cut into the tunnel-head spirally and effects such operation first through the outer extremity of the cut-out tunnel-walls and then reversely from the center of the cut formed outward toward the perimeter or outer edge of the wall.

Another and essential object of this invention is to provide an improved mechanism of the kind specified involving a peculiar construction of cutting-shovel adapted to move spirally in reverse directions and also in a direct forward line when necessary to enter at the sides of a boulder, whereby its spiral movement will serve to pull out the boulder.

A still further object of this invention is to provide a tunneling-machine having a positive means for holding the freshly-made walls of the tunnel in a true shape as the new cut is being made and the portion at the rear of the wall-supporting means is being lined.

A still further object of this invention is to provide a digging mechanism, means for operating the said digging mechanism spirally, straight ahead, and reversely, and conveyer devices continuously operated in one direction as the digger is operated in either direction.

With various other objects in view, which will hereinafter be particularly referred to, the invention consists in a tunneling-machine embodying the peculiar combination and novel arrangement of parts, such as will first be described in detail and then be specifically pointed out in the appended claims, reference being had to the accompanying drawings, in which—

Figure 3:
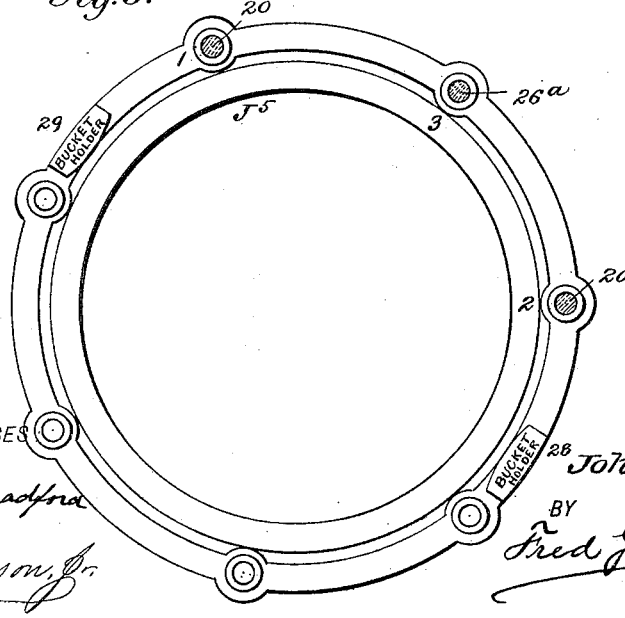
Figure 6:
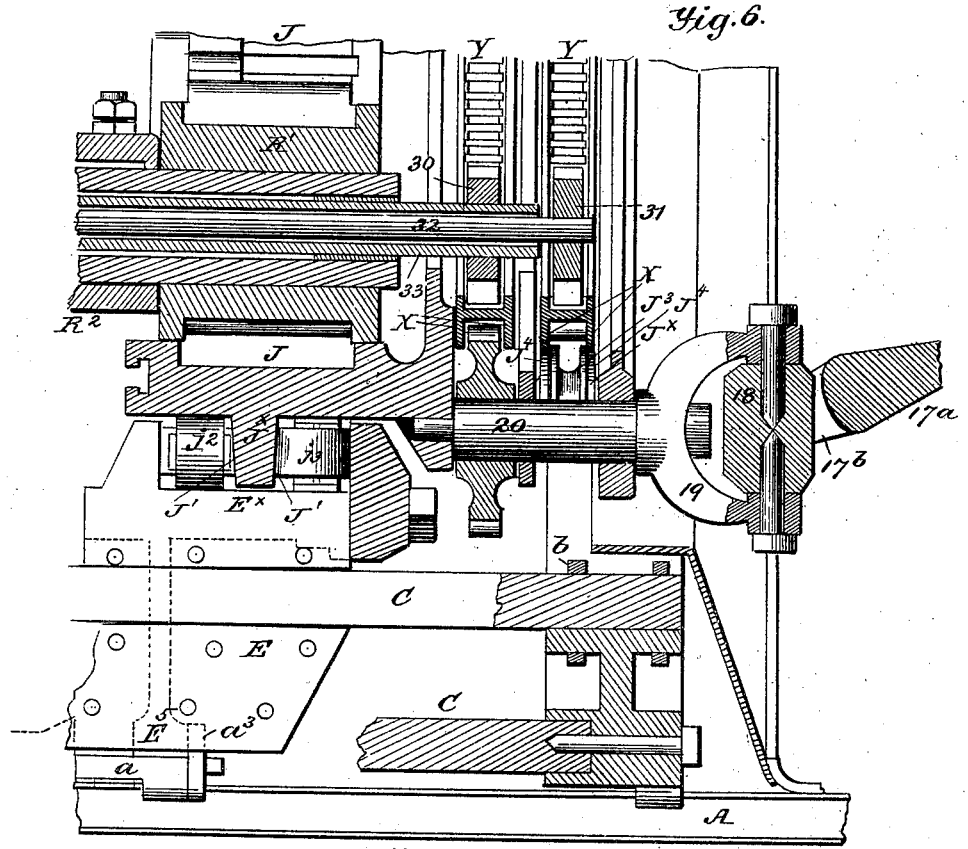
Figure 7:
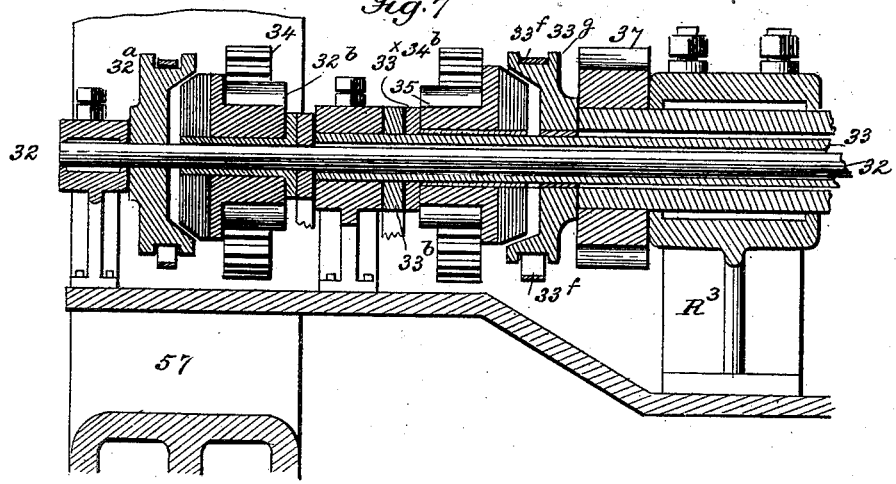
Figure 16:
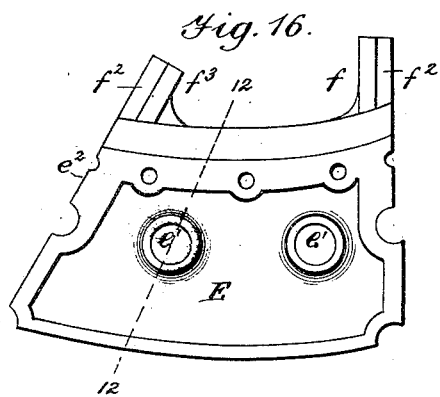
Figure 17:
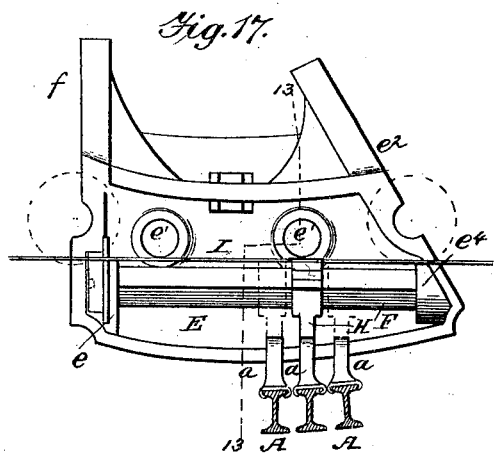
Figure 25:
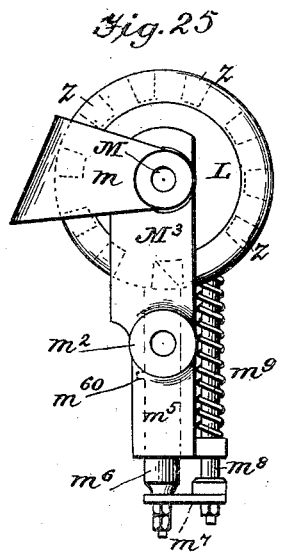
Figure 26:
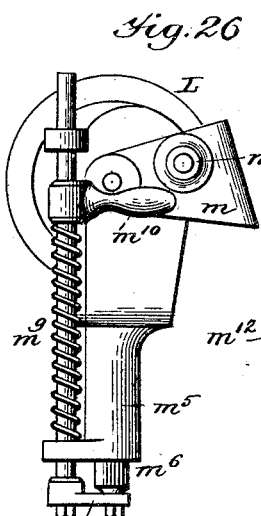
Figure 27:
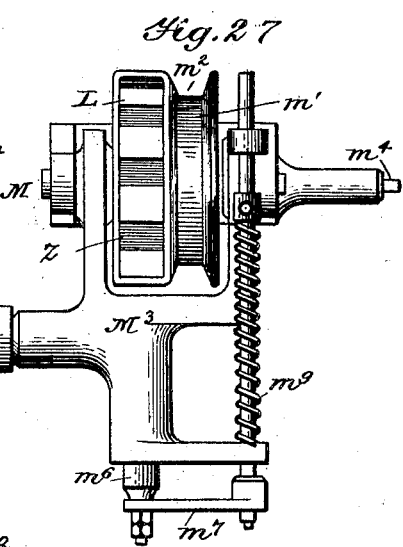
Figure 28:
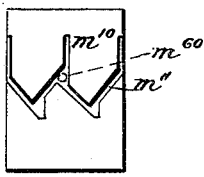

Figures 1 and 1ª on Sheets 1 and 2 represent a vertical longitudinal section of my tunneling-machine, showing the same as in use, the digger parts and supporting-frame being in the position they assume as the plow reaches a cutting position, about one-third of its cut from the center to the outer edge, the section of the operating mechanism being taken practically on the line 1 1 of Fig. 2. Fig. 2 is a front elevation of the operating mechanism, parts being in cross-section. Fig. 3 is a detail face view of the master-wheel, showing the relative positions of the digger-arms and the buckets. Figs. 4, 4ª, 4ᵇ, and 4ᶜ represent each a quarter-section of a horizontal plan view, on an enlarged scale, of the main and supplemental frames and digger-operating means, the section being taken practically on the line 4 4 of Fig. 2. Fig. 5 is a detail view of the double clutch devices hereinafter specifically referred to. Fig. 6 is a detail longitudinal section of the lower end of the master-wheel, the frame supporting it, and one of the drive devices for the digger-plow arm. Fig. 7 is a similar detail vertical section of the operating-gear mechanism. Fig. 8 is a front face view of the master-wheel and the cam carried thereby. Figs. 9, 10, and 11 are cross-sections taken on the lines 9 9 10 10 11 11 of Fig. 8. Figs. 12 and 13 are side elevations, partly in section, illustrating a pair of frame members forming one of the main frame-sections E, said views being taken substantially on the lines 12 12 and 13 13 of Figs. 16 and 17, respectively. Figs. 14 and 15 are face views of the sections shown in Figs. 12 and 13. Figs. 16 and 17 are views of the opposite ends of one of the aforesaid section members. Figs. 18 and 19 are detail views of the rail-shifting devices. Figs. 20 and 21 are detail sections of one of the diverging shovel-arms and of the central or hinged arm. Figs. 22, 23, and 24 are detail views illustrating one section of one of the supplemental frame-supporting rims; Figs. 25, 26, and 27, side and end views of the shifting mechanism hereinafter referred to. Fig. 28 is a diagram showing the pawl-socket in the mechanism just mentioned split and opened out flat to illustrate the internal groove.

In its practical construction my invention embodies generally a main or supporting frame, a supplemental frame upon which the main frame is held to slide, and an annular shield upon which the entire structure rests and which in itself is formed of a series of members independently movable in a longitudinal direction automatically by suitable feed devices held on the main supporting-frame.

To make the construction and operation of my invention the more readily understood, I shall first describe the structure and operation in a general way before specifying in detail the peculiar combination and novel arrangement of parts and the detailed manner of operation thereof.

The shield or supporting-frame is composed of a series of longitudinally-disposed members arranged in a circle the tread or external diameter of which is the diameter of the tunnel before it is lined. These members are in the nature of I-beams or rails and serve for a number of distinct purposes—first, to provide an external shield or bearing which supports the walls of the newly-cut tunnel preparatory to its being lined; second, to provide a creeping or feed means for carrying the entire structure forward toward the head of the tunnel, and, third, to form suitable guides for supporting the supplemental and main frames and facilitate their ready operation. All of the shield-rails except a predetermined number have a free sliding connection with the sliding mechanism and are movable independent of each other. The others are fixedly connected with the supplemental frame and form the supports therefor and are movable forward with said frame. The main frame is held for longitudinal movement on the supplemental frame, and as it is moved forward it carries with it the gear mechanism which operates the digging devices. In practice the shield is formed of one hundred and twenty (more or less) independently-movable rails and twelve (more or less) rails fixedly connected to and movable with the supplemental frame. The gear devices in the structure shown are so arranged that at each complete revolution of the master cog-wheel twelve of the independently-movable rails are moved one at a time and successively outward, ten revolutions of the said wheel serving to move out the entire set of rails a predetermined distance.

In the operation of the machine the master cog-wheel moves all of the independently-movable rails forward, and after they have all been thus moved a certain operating mechanism for imparting a spiral feed to the plug or digger is turned out of gear, as will hereinafter be fully explained, and after the said movable rails have all been moved forward by the action of the master cog-wheel additional revolutions are imparted to such wheel, the purpose of which is to carry the digger-operating mechanism and the digger-plow directly forward to a predetermined distance, and when this has been done the digger-plow-operating mechanism is again set in gear to impart a proper movement to the said digger-plow. This operation is repeated until the main frame and the parts carried thereby are moved forward their full movement on the supplemental frame. By means of certain screw-operated devices the supplemental frame is again moved forward on the rails to its furthermost forward position.

It should be stated the digger-operating gear mechanism is arranged to impart either a spiral movement to the shovel-carrying frame or a direct thrust thereof, and the master-wheel and the gear mechanism carried with it are constructed to impart a reverse motion to the digger, said digger being also constructed to dig in the spiral path first directly from the center to the circumference of the cut and then back from the circumference of the said cut to the center.

Having thus described generally the operation of my invention, I shall now describe in detail the mechanism by which the results stated are attained.

Referring now to the accompanying drawings, in which like letters indicate like parts, A A' indicate a series of beams or rails which are arranged in a circle equidistantly apart, as best shown in Fig. 2. Upon these beams or rails are mounted supplemental annular supporting-frames B B', (see Fig. 1ª,) the two frames being spaced a suitable distance apart and connected by a series of longitudinal arms C and a series of screw-rods D, the purpose of which will presently appear. The supplemental frames B B' are formed each of sections, as best shown in Figs. 22 and 2, by reference to which it will be observed said frames have suitable bearing-blocks $b$ $b'$ for the rods D and also bearings for the arms C. To facilitate their movement, the frames B B' each have a series of frictional rollers $b^2$, preferably of sufficient number to engage every alternate one of the series A, as clearly indicated in Fig. 2. Each of the twelve rails A' is fixedly attached to each frame B B', whereby the two frames B B' are rigidly connected to form the supplemental supporting-frame which rides on the rails A, as clearly shown in Fig. 2, by reference to which it will be also seen that each twelfth rail A' is fixedly attached to the frame members B B', whereby to rigidly connect the said frames B B' to form the supplemental frame above referred to.

The main frame—that is, that part of the machine that supports and carries the digger mechanism—includes a series of frame-sections which are mounted to slide upon a series of bars C, which act as guides and also as means for the more rigidly securing the frames B B' as a whole. On these bars the said frames (indicated by E) move, and these frames are also mounted upon and caused to slide back and forward by means of screw-rods D, the complete function and operation of which will presently more fully appear, said rods joining with the frame-sections B B'.

Each frame-section, one of which is illustrated in detail in Figs. 6, 12, 13, 14, 15, 16, and 17, consists of a body portion E, having threaded apertures E', through which the screw-rods D pass. One edge of each projected portion of the frame-section E is cut off at an angle, as at $e^2$, radiating from the center axis of the complete annular frame composed of all the sections E, while the other edge is cut off at such an angle as to provide for a proper annular wedge assembling of the several sections E and also to provide for bearing-boxes $e^3$ $e^4$ on the rear face of the section to receive the pintles of the rock-shaft F, one end of which is connected to a crank member $g$, (see Figs. 18 and 19,) which extends out to the front of a vertical extension $f$ of the section, which has a half groove or channel way $f^2$, which in connection with a similar channel-way on the extension $f^3$, formed in the angle edge of the adjacent section, provides a groove in which the shank $g'$ of a sliding arm G moves, (see Fig. 1a,) which arm carries a roller $g^2$ for a purpose presently explained. It should be stated each section E has a rock-shaft F, and a crank and sliding arm connected to each shaft is provided at the meeting ends of each pair of sections.

Each section E is of a length to take in ten of the shield-rails, and the meeting ends of each pair of sections E are provided at their peripheral edges with a bearing portion $e^5$ for the purpose presently explained.

Upon each rock-shaft F is mounted a dog H, movable laterally thereon, and which is connected with an endless cable I, which is common to all the dogs of the entire series of sections and which connects with and is operated by a shifting mechanism at the end of each complete rotation of the master cog-wheel, as will be hereinafter fully set forth.

By referring now more particularly to Figs. 4 and 17 it will be noticed each rail A has a clamping member $a$, and the members $a$ engage with cut-out portions $A^{\times\times}$ of the rails A, and they are detachably connected therewith. Each of the said clamping members $a$ has projecting shoulders $a'$, a backing-shoulder $a^4$, and stop-shoulders $a^2$ $a^3$, between which the portions $e^5$ of the frame-segment E play and alternately abut.

The sections E form the main or annular rim of the main frame, which rim has an internal seat $E^{\times}$, within which is supported and held to revolve the main or master cog-wheel J, which, as will be seen, is spokeless and has a central annular external or guide flange $J^{\times}$, with which and the peripheral edges J' the friction-rollers $j^2 j^3$ engage.

The master-wheel J (see Figs. 8 to 11) carries on its rear face a suitably-arranged cam K, the ends of the groove of which are open. This cam K is so disposed relatively to the rollers $g^2$ that it will successively engage such rollers as the wheel J revolves and draw such rollers $g^2$ inward. This successive inward movement of the rollers $g^2$ and the arms G is the means utilized to move the several rails A forward, which operation is best explained as follows: By referring to Figs 1a, 17, and 19 it will be seen that the dog H on the rock-shaft E is held normally—that is, when the arm G is at its outward position—in engagement with the shoulder $a'$ on the rail-clamp member $a$. Now as the cam K on the wheel J engages and pulls the roller $g^2$ and the arm G inward it will rock the shaft E and cause its dog to push the rail forward in the direction indicated by dotted arrow in Fig. 1, after which the cam K will force the arm G and its roller $g^2$ back again to its outer position. This operation is repeated until all the rollers $g^2$ and arms G have been engaged by the cam K, which occurs during each complete revolution of the wheel J, thereby forcing out twelve of the rails A a predetermined distance into the head of the tunnel. After the cam K engages the last roller $g^2$ on each complete revolution of the wheel J it engages a shifting mechanism and operates the same to pull on the cable I, connected to all the dogs, and move the entire set of dogs laterally the distance of one rail on their respective shafts E. The construction of this shifting mechanism is best illustrated in Figs. 25, 26, and 27, by reference to which it will be seen that such mechanism comprises a ratchet-disk L, having a series of notches Z (ten being used in the construction shown) and a smooth peripheral portion Z' of a length equal that of the space of two notches, the purpose of which will presently appear, such notches being relatively so spaced apart as to represent the distance between a pair of shield beams or rails. This disk is loosely held on a short shaft M, supported in a bracket $m$, secured to the main frame at $m^{\times}$, (see Fig. 2,) and such disk has a hub $m'$, having a groove $m^2$, around which the cable I is wound, such cable also passing over guide-rolls $m^{16}$.

$M^3$ indicates a hanger-frame loosely held on the shaft M, which is normally held up to the position shown in Fig. 2, it being held to such position by the spring-dog $m^4$, mounted on the said frame $M^3$ and provided with a beveled end to engage with the notched disk L. (See Fig. 25.) At one end the frame $m^3$ has a tubular socket $m^5$, in which is held a slide-pawl $m^6$, the lower end of which connects with the bracket end $m^7$ of a push-rod $m^8$, slidable lengthwise of the frame $m^3$ and held in suitable brackets on such frame, such rod being normally held to push the pawl $m^6$ up into engagement with the disk L by the spring $m^9$, it also having a handle member $m^{10}$. The purpose of the pawl $m^6$ is to hold the frame $m^3$ and the ratchet-disk L in a proper relation, so that when the cam K on the wheel J comes into engagement with the roller projection $m^{12}$ (see Figs. 2 and 27) the said disk L will be turned one notch, and to provide for a proper movement of the pawl to turn the disk L in reverse directions as the wheel J is turned transversely the socket $m^5$ $m^5$ on the frame $m^3$, in which the pawl operates, is provided with a compound longitudinal and diagonal groove $m^{11}$, with which a lateral stud $m^{60}$ on the pawl engages, said groove $m^{11}$ being of such arrangement that when the pawl is shifted or pushed down, which is effected by pressing the spring-actuated rod $m^8$ down, (said rod having a handle $m^{10}$ and a piece $m^7$ connecting with the pawl $m^6$,) the pawl $m^6$ will be rotated and its beveled ends set to rotate on the disk to turn it in a reverse direction, when the digger devices are set to move in a reverse direction. To prevent the pawls $m^6$ rotating during the movement effected by the engagement therewith of the disk L during the intermittent rotation of the said disk L, the member $m^{60}$ is normally held to engage with the straight part $m^{20}$ of the groove $m^{11}$, the general arrangement of which is diagrammatically illustrated in Fig. 28. The roller projection $m^{12}$ lies in the path of the cam K and is engaged thereby immediately after the last one of a series of ten rails has been moved forward, thereby to swing the frame $m^3$ first outward and then inward, it being understood by referring to Fig. 28 that as the pawl has an incline or bevel face it will climb out of the notch in which it last seated on the outward swing of the frame and slip into engagement with next succeeding notch, and thereby as the frame swings back again rotate the disk in the direction indicated by the arrow (see Fig. 2) and turn it to pull on the cable I sufficient to cause such cable in its movement to move all of the rail-engaging dogs H laterally the distance of one rail, whereby to bring them in position to engage such rails on the next rock movement of the shaft E. This operation is repeated until all of the movable rails A have been pulled forward, at which time the pawl $m^6$ rests in the notch adjacent the smooth peripheral edge Z' of the disk, where it remains during the forward movement of the supplemental frame and the rails A', which is accomplished in the manner hereinafter described.

In the construction shown the digger devices complete their cut in one direction, and as the next cut is effected by a reverse operation of the machine it follows that the next operation of the shifting-disk must also be reverse. This is effected by making the pawl $m^6$ slidable in the socket and at the same time rotatable therein. Thus by pushing the rod downward the pawl will be turned in a position to engage the disk and turn it on the first or outward movement of the frame $M^3$ and climb over into the next notch by the inward movement of such frame.

I shall now describe the manner in which the digger mechanism is moved automatically forward. This mechanism consists of a number of rods D, which extend longitudinally of the machine and are held fast at the opposite ends in the outer and inner supplemental frame or annular rims B B', as clearly shown in Fig. 1. These rods are each provided with short screw portions $d^2 d^2$, which pass through and engage the internally-threaded tubular extensions $b^3 b^3$, having chain or drive wheels $B^2 B^2$ fixedly connected therewith, and the said tubular extensions are carried by the main frame and are arranged to rotate on the stationary screw-rods as such frame is revolved, such rotation of the wheels $B^2 B^2$ being effected by means of a series of drive-cogs O O, Figs. $1^a$, $4^b$, and $4^c$, journaled in inwardly-extending bearings P P, supported on the main frame, which are held to mesh with the internal gear-wheel J and to be rotated thereby. In the present construction I employ six of the cogs O, each of which connects, by means of suitable chain-wheel gearing Q Q, with a series of four of the chain-wheels $B^2 B^2$, suitable idlers Q' being provided, so arranged as to impart the desired rotation to the several drive-wheels $B^2 B^2$, and thereby feed the tunneling-machine forward or backward on the screws, which movement is effected by the reverse rotation of the gear J. The shaft of each drive-wheel O has a clutch member $b^4$, with which engages a clutch-lever $b^5$, which levers $b^5$ are all connected to a chain or cable $b^6$, which in turn is connected to a shifting-lever 2, disposed adjacent the operator's platform R. By referring more particularly to Fig. $4^c$ it will be noticed the flange $E^5$ of the main-frame sections has a limited movement between the stop-shoulders $a^2$ and $a^3$ of the rail-clamps $a$, which in the present instance is, say, three inches. When in the position shown in Figs. $1^a$ and $4^c$, the main frame has just completed a forward movement of three inches. During the movement the mechanism for shifting the rails is out of gear, the pawl $m^6$ at this time riding on the smooth face of the disk L. After the main frame has been moved forward the distance stated the drive-wheels $B^2 B^2$ are thrown out of gear by the lever 2 and held out of gear during the next ten revolutions of the gear J. During such ten revolutions of the said gear J the rail-feeding mechanism operates to pull successively the entire one hundred and twenty rails A forward until the shoulders $a^2$ engage the flange $E^5$ of the main frame. This operation is repeated until the main frame has been moved forward on the supplemental frame its full distance. After the main frame is moved forward to its full extent on the supplemental frame such supplemental frame is pulled with the twelve rails A forward again its full extent, which operation is effected by reversing the movement of the gear J, the action of the main frame, and the drive-wheels $B^2$, which at this time are held from longitudinal movement on the rods $d$ of the supplemental frame by the shoulders $a^3$ of the rail-clamps, it being understood that as the wheels $B^2 B^2$ are thus held from movement on the screw-rods, such rods will be fed forward and carry with them the supplemental frame. To back out the lengthwise-movement frames, a reverse operation of the main gear will effect such result, as during such operation the dogs H will engage the shoulders $a^4$ of the rail-clamps to move the rails backward, and the flange $E^5$ engages the shoulders $a^3$ to prevent the main frame moving forward.

At this point it should be stated, that as the supplemental frame has suitable bearing-rollers $b^2$, Fig. 22, to facilitate the movement on the rails, and that by moving but one rail at the time, the twelve rails on the supplemental frame and the bearing of the entire structure will be on the other rails A, the inward pressure of the earth being on the said rail-shield against which the single rails bear when they are pulled forward.

The master-gear J is driven by a main drive-gear R, mounted on a tubular shaft $R'$, journaled in bearings $R^2$, supported on the section $R^3$ of the main frame, and on which are mounted a pair of drive-gears $R^4 R^5$, with which mesh at each side a pair of drive-gears S S S' S', mounted on crank-shafts T T', as clearly shown in Figs. 4, $4^a$, $4^b$, and $4^c$. These shafts are driven by the pitman-rods $T^2 T^2$ of the engines $T^3 T^3$, arranged one at each side of the main drive-shaft $R'$.

$R^4 R^5$ indicate gears loosely mounted on the tubular shaft $R'$, and these gears are arranged to be alternately set to an operative position by suitable clutch devices. (Best shown in Figs. $1^a$ and $5^a$ and hereinafter more fully described.) The gear $R^4$ meshes with a slow gear S (see Fig. 4) and the gear $R^5$ with a fast gear S'. By providing the two sets of gears $R^4$ S and $R^5$ S' the several parts just referred to can be so adjusted that when the plow works at or near its greatest circular sweep the slow gears $R^4$ S can be quickly thrown out of operation by a proper shifting of the clutch mechanism and the fast gears $R^5$ S' likewise thrown into an operative position.

U U' indicate a pair of clutches held to slide on and to turn with the shaft $R'$ and which are adapted to be alternately set by means of a clutch-ring $U^2$, held between the hubs of the clutches U U', as clearly shown in Fig. 5, by reference to which it will be seen the ring has a pair of lateral lugs $u^2 u^2$ alternately disposed, which are adapted to be alternately moved into engagement with lugs $u' u$ on the clutches U' and U.

The clutch-ring $U^2$ is operated by a lever V, Figs. $4^a$ and 5, connected to a crank portion of a rock-shaft V', Fig. 2, with which connects the hand-lever $V^2$, as shown. By this arrangement of gearing clutch devices it will be readily seen that by throwing the clutch $U^2$ so its lug $u^2$ engages the lug $u'$ it will connect the gear $R^5$ with the shaft $R'$ and rotate it at its rapid speed, while a further adjustment of the ring $U^2$ will cause its opposite lug $u^2$ to engage the lug $u$ on the clutch-ring $U^2$ and connect the slower driving-gear with the shaft. By setting the ring so that both lugs $u' u^2$ are held freed of the lugs $u u'$ both gears $R^4 R^5$ will be held from rotating and the shaft $R'$ and master-wheel J also held from rotation.

As the gears $R^4 R^5$ are held loosely on the shaft $R'$, such shaft is provided with fixed clutch members W W', which the gears $R^4 R^5$ engage when moved to an operative position by the clutches U U', such clutches W W' serving to produce a positive connection between the shaft $R'$ and the gears $R^4 R^5$.

The master-wheel frame is extended forward, as at $J^5$, and is provided with an annular external channel-way $J^{10}$, in which are held series of guide and supporting rollers $J^3$, having flanges $J^4$ to receive the external flanges X X of a pair of annular drive-gears Y Y', which have internal and external teeth $y y'$, as clearly shown in Fig. $4^c$.

The drive-gears Y Y' are employed for driving the diggers, and I therefore term such gears Y Y' the "digger-operating" mechanism proper.

The digging devices (see Fig. $1^a$) consist of a single digger-plow 10, mounted in a suitable carrier-head 11. This head has rearwardly-diverging sockets 12 12, in which are fixedly held the tubular arms 14 15, threaded on the inside, as shown in detail in Fig. 20, to receive the threaded ends 16 17 of the rods $16^a 17^a$, the ends of which terminate in yokes $16^b 17^b$, which are connected, by means of universal joints 18 18, to the yoke ends 19 of rotatable shafts 20, (see Fig. 6,) journaled in the master-gear-carrying frame and which have drive-gears 21, held to mesh with the external toothed rim of the drive-gear Y.

22 indicates a socketed arm, which has a hinged connection $22^a$ with the head 11 and has internal threads $23^b$ to receive the external threads $23^a$ of the tubular shank 23, which is also provided with internal threads $23^b$ to receive the externally-threaded end $24^a$ of the rod 24, which has a yoke end $24^b$, connected by the universal joint 25 with yoke end 26 of the shaft $26^a$, held to rotate in bearings in the master-wheel frame and having a drive-gear held to mesh with the external teeth of the drive-wheel Y'. To protect the threads of the several screw-shanks from mutilation and undue wear, they are arranged as shown in detail in Figs. 20 and 21.

The several arms or rods which join the digger to the master-gear frame are connected thereto at one side of the center, as indicated at 1 2 3 in Fig. 3. The object of connecting the arms to the frame in this manner is to avoid the possibility of the shovel dropping a boulder onto the lowermost bucket 28, which bucket, as its mate 29 (at a diametrically opposite point,) is thereby always out of a direct opposite line of the plow or shovel.

To operate the gears Y Y', I provide a pair of gears 30 31, one of which is fixedly held on the end of a tubular shaft 33, held within the shaft R', while the other is secured on the end of a shaft 32, held within the shaft 33. The shaft 32, Figs. 4 and 4$^a$, carries at its outer end a fixed clutch-wheel 32$^a$ and a loose drive-gear 32$^b$, which is held in mesh with a drive-gear 34 on a counter-shaft 34$^a$, which shaft is also provided with a gear 34$^b$, which meshes with a gear 35, loosely held on the shaft 33, and a gear 36, which receives motion from a gear 37 on the main shaft R'. The shaft 33 has a clutch 34$^x$, which has a shifting-arm 33$^b$, connected to a crank 33$^c$, secured on a hollow shaft 33$^d$, mounted in suitable bearings and provided with an operating-lever 33$^e$. The shaft 33$^d$ is also provided with a crank member to which the end of a band-brake 33$^f$ is secured, which passes over the clutch 33$^g$, the clutch and brake-band cranks being so disposed on the shaft 33$^d$ that the movement of the lever in one direction will apply the band-brake and move the clutch to a release position, while the opposite movement will reverse such action, the intermediate adjustment of the lever setting both the band and the clutch devices to an inoperative position. The shaft 32 is also provided with a brake-band and clutch-operating mechanism, constructed in the same manner as the above described devices, they being secured to a shaft 36$^a$, held to turn in the shaft 33$^d$ and provided with a lever 37.

To provide for driving the shafts 32 33 when the main shaft R' is not rotated by the engine, or to drive the said shafts 32 33 at a greater speed than is transmitted from the said shaft 31, a gear 36 is slidably held on the counter-shaft 34$^a$, which is adapted to be moved into or out of engagement with a gear 37 on the shaft R' by means of a shifting-lever R$^{20}$ (see Fig. 4) and into or out of mesh with a similar gear 40 on the shaft R$^{10}$, that carries the gear S.

The manner in which the digger mechanism is operated is best explained as follows: Assuming the digger-plow to be moving from the perimeter of the cut toward the center and the master-gear operated to rotate to effect such movement and the shaft 32 held in gear with counter-shaft 34$^a$ and the shaft 33 held to rotate free from direct gear connection with such shaft 34$^a$, the plow-carrying arms will be carried in a circle with the master-wheel frame and at the same time be moved spirally inward, which operation is effected as follows: As the shaft 33 turns freely in its bearings and as the frictional bearing of the gears carried by the shafts 20, to which the outer diverging arms of the digger-carrier are connected, is much greater than the resistance of the freely-movable shaft 33, it follows that as the master-wheel frame rotates the gears J$^3$, which engage the external teeth of the gear Y, will become fixed gears and in consequence turn the wheel Y at a speed equal that of the master-gear, such operation holding the diverging arms 14 15 from a longitudinal feed movement outward, making such arms during their operation of a fixed length. Now when the shaft 32 is geared for a positive action it will rotate the gear-wheel Y' twice as fast as the master-wheel J, (which result is obtained by the different sizes of the gear-teeth,) and as it so rotates it will rotate the shaft 20, which carries the universal joint to which the hinged arm 24 of the shovel-carrier is attached, and thereby operate the feed-screw 24$^a$ (see Fig. 21) to gradually swing the shovel-carrier outward as it is carried in a circle with the master-gear frame, and thereby cause it to travel spirally inward toward the central axis of the tunnel, as before stated, it being obvious that when the motion of the digger-operating mechanism is in a reverse direction the operation of the feed-screw on the hinged arm will serve to draw the shovel-carrier inward as it digs from the center to the circumference of the tunnel-head, such reverse operation of the digger mechanism being effected by applying the brake to hold the shaft 32 from rotation, which serves to hold the gear-wheel Y' from rotating, and as the plow, with its arms, is carried forward by the master-gear frame the gear engaging the external teeth of the wheel Y', now held from rotation, will be thereby revolved in a reverse direction and pull the shovel inward as it travels from the center of the cut to the circumference thereof. To provide for a removal of a boulder in the path of the spiral cut of the shovel, the digger-operating means is set to impart a continuous circular cutting movement to the shovel. This is accomplished by putting the shaft 33 in a direct gear connection with the shaft R', which will cause the gear 33$^a$ to impart a rotation to the wheel Y' at the same speed as wheel Y' travels, and as such wheel Y is thus rotated it will rotate the gears on the shafts to which the diverging arms of the shovel-carrier are connected, and in consequence feed out such arms uniformly with the outward feed of the central or hinged arm, thereby holding the carrier projected forward in a fixed relation to the rotating members 24 24$^a$ to which it is attached as it is fed directly forward, such adjustment and feed of the screw-arms causing the plow to dig a circular channel at one side of the boulder.

After the channel-way at one side is dug to a depth equal or more than the depth of the boulder the digger mechanism is adjusted to cause the plow to dig a circular channel at the other side of the boulder to a desired depth. The digger mechanism is then adjusted to cause the shovel to engage the boulder, which being thus previously loosened will readily be pulled out of the way. In case the boulder is of a very large and deeply-embedded nature the shovel can be moved spirally until it moves up to the boulder and then reversed until it engages the opposite side of the boulder, and such operation is repeated until the earth at each side of the boulder is removed sufficient to admit of the boulder being pushed out by the shovel. To further facilitate the removal of a boulder, a reciprocating—that is, an outward and inward—feed of the shovel is obtained by throwing the main wheel J out of gear, which is done by throwing the shaft R' out of gear with the engines and at the same time shift the gear 40 so as to impart motion to the shafts 32 33 direct from one of the engine crank-shafts. By this adjustment the reversing of the engine will cause the shovel to be moved inward and outward at the side of the boulder, and thereby admit of the shovel getting back of the boulder and pulling the same out.

As before stated, the master-gear and the digger-operating feed-gearing wheels are spokeless, so as to admit of the passage of an endless carrier mechanism. This mechanism, which is most clearly shown in Fig. 1ª, consists of a chute 50, which is arranged to receive the dirt from the buckets 28 29 as they reach their highest point, such buckets having swinging bottoms 52, held normally closed by a suitable latch device adapted to be released by its trip-arm 53 engaging a stop 54, projected out from the main frame, as shown in Fig. 1ª. While I have shown this form of releasing means, I desire it understood that any well-known means may be employed for dropping the bottom of the bucket as it reaches its dumping position.

55 indicates the endless chain of buckets, which passes over suitable guides and drive-rolls and which extends out to the extreme discharging end (see Fig. 1) of the tunnel for a purpose presently explained, such endless chain of buckets being supported on hangers 56, (see Fig. 2,) secured to the main frame, and hangers 56ª, supported on the pendent beams 58ª 58ᵇ, in turn supported by the truss-frame, which is held at one end on the masonry and at the other a supplemental traveling frame 57. (See Fig. 2.)

As the digger mechanism and the feed devices for moving the entire operating mechanism are arranged to be operated reversely and as the feed of the conveyer must at all times be outward, I provide a shaft 59, (see Fig. 2,) having a sleeve 60, held to slide on the shaft 59, provided with a pair of bevel-gears 61 62, which are adapted to be alternately moved into engagement with a drive-gear 63, held on one of the shafts of the cogs O, which mesh with the master-wheel J, such sleeve being adjusted by means of a train of crank-lever devices 65, which connect with a lever 1, disposed in convenient reach of the engineer. The gear 62 has a grooved pulley 62ª, over which and the pulley 62ᵇ on the outer shaft 62ᶜ passes the endless cable 62ᵈ, which operates the carrier.

The frame or end rest 57 is held to travel on a series of shield-rails 66, which are rigidly connected to the rails A A' and at the bottom extend back a short distance from the frame 57, while at the top they extend back a considerable distance, so as to form suitable supports for the crown of the tunnel at points between the member 57 and the supports 58ª 58ᵇ, they being made somewhat heavier than the rails A A' to withstand the extra supporting strain.

The upper rails 66 are supported by means of a truss-frame 70, held at its front and fixedly connected to the slide or rest frame 57 and at its rear end on platform 71, which is supported on the brick lining of the tunnel, as clearly shown in Fig. 1, it being obvious that as the sides of the lining are brought up to the point shown the platform 71 is placed in position to provide for the travel forward of the truss-frame with the main or tunneling mechanism. To facilitate the travel of the truss-frame, its rear end has a series of roller-bearings 72 72, which ride on the platform 71. 73 and 74 represent suitable bracing-rods for equalizing the weight of the rails 66 on the truss-frame. To admit of a free movement for the masons, the ends of the rails are cut off diagonally, as shown in Fig. 1.

To hold the masons' scaffolding and other implements always in a proper relation to the digging mechanism and to carry it along with the said mechanism, I provide a movable platform 75, having trucks 76, which are held to travel on the bottom of the lined part of the tunnel. This platform is connected to the frame 57 by a suitable cable 77 and in practice carries all of the masons' scaffolding and other material, (not shown,) it also having suitably-arranged tracks for the cars 78.

It will be noticed by reference to Fig. 1 that the endless carrier extends back to the point where the tunnel is completely lined and that the distance between the beginning of the brickwork and the finished lining is such as to admit of a number of cars being run into that part of the tunnel being lined, such arrangement of parts being to allow the cars with the masons' material to run up close to the work.

To facilitate the operation of building the wall, two trackways for the cars are provided, which are joined by transverse carrier-platforms 80, the purpose of which is to allow the unloaded car to be moved transversely onto the other track and moved outward in position to receive the earth from the endless carrier, providing, as it were, for a simultaneous carrying of the material to the masons and carting away the earth delivered from the carrier.

From the foregoing it will be seen that I provide means for digging the tunnel, for supporting the crown of the newly-made tunnel-walls while the lining is being built, and carrying the masons' platform and the crown-supporting means forward as the tunnel is being dug, the several parts of the mechanism being so arranged and combined that ample room always remains for the masons between the end of the fresh lining or wall and the end of the digging mechanism.

By constructing a tunnel in the manner shown and described a uniform cut or opening is made and the walls of the tunnel always properly supported and the danger of the walls caving in practically overcome. Furthermore, as the cut is made without blasting or hammering a tunnel can be safely cut under a waterway without danger of opening up crevices between the water-bed and the tunnel-top. Again, the operation of digging and lining is practically a simultaneous one, as the entire mechanism is joined to move together.

Various changes in the details of construction and the arrangements of parts may be made without departing from the principle of my invention.

85 indicates a hoist (see Figs. 1 and 1$^a$) held to travel on the endless-carrier guide-frame 86 and which has suitable grapple-claws and is adapted to be run forward to the digger devices and lift any boulder which may drop in front of the digging mechanism and carry it rearward to the cars.

Having thus described my invention, what I claim, and desire to secure by Letters Patent, is—

1. A tunneling-machine, having a digger mechanism including a plow movable in a circular sweep, means carried on the machine for imparting the said sweep movement to the plow and simultaneously forcing it forward and in a spiral direction, and means for automatically shifting the movement of the plow to cause it to travel from the perimeter of the machine inward, or from the axis of the machine outward during its sweep movement, for the purposes specified.

2. A tunneling-machine having a rotatable-plow carrier and means for moving the plow radially to or from the axis of its rotation, substantially as shown and described.

3. In a tunneling-machine, the combination with the digging mechanism, of a shield surrounding the same and forming a support therefor, said mechanism including means for holding the shield fast and moving itself forward, and for remaining stationary as it pulls the shield forward as specified.

4. In a tunneling-machine, the combination with the digging mechanism, adapted to cut a circular opening, of a shield surrounding and supporting such mechanism, and formed of a series of rails movable lengthwise, independently, and means operated by the digger mechanism for feeding such rails forward successively as the digger operates, as set forth.

5. In a tunneling-machine, the combination with the main frame, the digging mechanism supported thereby, the supplemental frame, and connections joining such frames, the adjustment of which will set the two frames in position for movement backward or forward independently, a shield formed of a series of rails connected with the main frame, and independently movable, and means carried by the main frame, for moving such rails successively forward one at a time, as specified.

6. In a tunneling-machine, a digging mechanism, its supporting-frame, and a scaffold-platform supported at one end upon the newly-made brick lining and at the other connected with the digging mechanism, whereby it is drawn forward with the said mechanism as specified.

7. A tunneling-machine, comprising a shield, a supporting-frame movable thereon, a digger-plow, mechanism carried by the supporting-frame, said mechanism, including spokeless drive gear-wheels, elevator devices carried around with the said gear-wheels, means for imparting reverse movement to such gears, an endless carrier movable continuously in one direction through the said gear-wheels and means for operating such carrier for the purposes set forth.

8. In a tunneling-machine, the combination with the digging mechanism and the supporting-frames therefor, of the tunnel-crown-supporting means extended rearward from and connected to the said mechanism and a supporting-frame for such crown-supporting means supported and movable at one end on the newly-made tunnel-lining and connected at the other end to the digging mechanism and movable forward therewith, as specified.

9. In a tunneling-machine as described, the combination with the supplemental frame, a series of shield-rails fixedly connected thereto, a main frame carrying the digger mechanism movable on the supplemental frame, a series of independently forward movable shield-rails, means operated by the digger mechanism for successively moving singly each of the movable rails forward, and then moving the supplemental frame with its attached rails forward as specified.

10. In a tunneling-machine as described; a supporting-frame; a digger-plow carried thereon; means for imparting a circular sweep to the said plow and for simultaneously feeding it forward radially in a spiral direction, as shown and for the purposes specified.

11. In a tunneling-machine, the combination with the supplemental frame and the supporting-shield, of the main frame movable on the supplemental frame, the master-gear J and the internal and externally toothed gear-wheels Y Y' carried thereby, drive mechanism supported on the main frame for imparting uniform motion to the gears J Y Y', of the digger-plow consisting of a carrier-head, outer diverging arms and a central hinged arm connected thereto, a shaft geared with the external rim of the wheel Y' having a universal connection with the hinged plow-arm, shafts geared with the external rim of the wheel Y having a universal connection with the diverging arms, said plow-arms having screw-operated extensible portions, and drive-gear mechanism for imparting either a uniform motion to the gears J Y Y' or a uniform motion to the gears J and Y' and an independent free motion to the gear Y substantially as described and for the purposes specified.

12. In a tunneling-machine as described, a rotary carrier-frame, a supplemental frame, and connections between such frames for feeding the rotary carrier-frame forward as it rotates, and the drive mechanism therefor supported on the carrier-frame, of the plow, consisting of a carrier-head, a pair of diverging arms and a central hinged arm, said arms being connected to the carrier-frame and means for moving the carrier-head straight ahead, or toward and from the axis of its rotation for the purposes specified.

13. A tunneling-machine comprising an exterior shield, a supplemental frame movable thereon, a main frame supported and movable on the supplemental frame, the digger-operating mechanism held on the main frame, said mechanism including a rotary-plow carrier-frame, clamp devices secured to the shield-rails, having stop portions adapted to limit the forward-and-backward movement of the main frame, means for feeding the main frame forward or backward and for drawing the supplemental frame forward or backward when the main frame reaches the limit of its movement in either direction for the purposes specified.

14. In a tunneling-machine, the combination with the supplemental frame and the exterior supporting shield-rails, said rails having inwardly-projecting front and rear stop members, a main frame movable on the supplemental frames a distance equal the space between the said stop members, and having portions adapted to engage such stop members, the digger mechanism held on the main frame said mechanism including a rotary-plow carrier-frame, means for moving the main frame on the supplemental frame in reverse directions, operated by the rotary-plow carrier, and adapted to pull the supplemental frame forward or backward when the movement of the main frame is retarded by the stops on the shield-rails, as specified.

15. The combination with the shield-rails having independent movement, and the digger mechanism supported by such shield-rails, said mechanism including a rotary-plow carrier, and the plow secured thereto, of devices operated by the rotary carrier adapted to successively engage the shield-rails one by one and move the same forward as the digger-operating mechanism is in use as specified.

16. The combination with the independently-movable shield-rails, and the digging mechanism, said mechanism including a rotary carrier and a plow secured thereto to rotate therewith, and shifting-gearing for imparting reverse motions to the carrier, of means for successively engaging the movable rails one by one to move the same forward, operated by the rotary-plow carrier, said rail-moving means having shifting devices, whereby to successively engage the rails from a reverse direction after all of such movable rails have been moved forward, substantially as shown and for the purposes set forth.

17. In a machine as described the combination with the independently-movable shield-rails, the supplemental and main frames, and the digging mechanism, said mechanism including a rotary-plow carrier, of means for moving the rails successively forward operated by the plow-carrier, said means having a shifting device adapted to throw the said rail-moving means out of an operative position at predetermined intervals, whereby the forward movement of such rails is stopped, substantially as shown and for the purposes specified.

18. In a mechanism as described, a supporting-shield formed of a series of rails independently movable of each other, a digging mechanism, said mechanism including a rotary-plow carrier, a supplemental frame held on the shield-rails, a main frame supporting the digging mechanism movable on the supplemental frame, and means operated by the rotary carrier for successively, first moving the rails forward, then the supplemental frame, and finally the main frame as specified.

19. A tunneling-machine comprising the independently-movable shield-rails, having shoulders, the supplemental frame and the main frame movable on the supplemental frame, the digging mechanism supported on the said main frame, and including a rotary-plow carrier, said main frame consisting of sections joined together to form annular supporting members, a rock-shaft journaled in each section, a dog held on each shaft to rock therewith and movable endwise therein, said dogs adapted to engage the shoulders of the rails, a cable connected to all of such dogs, and held in engagement with a shifting device, a cam secured to the rotary carrier, a crank member connected to each rock-shaft projected in the path of the said cam, said cam being arranged to successively engage the rock-shaft members, and at the end of each revolution of the rotary carrier to engage the dog-shifting device, as shown and for the purposes set forth.

20. In a tunneling-machine, the combination with the longitudinally-movable shield-rails, the supplemental frame having guide and screw rods, the main frame supported on such rods and having screw-housings engaging the screw-rods, said housings having shifting clutch devices, the digging mechanism said mechanism having a master-gear J and gear-operating devices therefor supported on the main frame, said screw-housings having cam-wheels, cog-shafts geared therewith and held to mesh with the master and gear, shifting levers for throwing the screw-housings cam-wheels out of gear, substantially as shown and for the purposes described.

21. In a tunneling-machine as described, the combination with the main frame the master-wheel J, the drive-gearing therefor, the wheels Y Y' the plow, having its arms formed with telescopic screw-sections, the main shaft R', the shafts 32 33 having gears engaging the wheels Y Y' as shown, the gear-shafts connecting the plow-arms and the wheels Y Y' a main drive-shaft geared with the shafts 33 33 and R' the shaft R' having a gear meshing with the master-gear, clutch devices for throwing the gear 33 32 and R' out of mesh with the main drive-shaft, said main drive-shaft having a slide-gear connection for joining the shafts 33 32 and the main drive-shaft, when the shaft R' is held from rotation as specified.

22. In a tunneling-machine, the combination with the digging mechanism and a supporting-frame therefor having the drive-gearing mounted thereon, of a shield formed of a series of independently-movable rails, means for moving such rails forward one at a time whereby to provide advance supports for the main frame, and means for moving such main frame forward when all of such movable rails have been advanced as specified.

JOHN E. ENNIS.

Witnesses:
   FRED. G. DIETERICH,
   A. E. DIETERICH.